(12) United States Patent
Kobayashi

(10) Patent No.: US 11,093,191 B2
(45) Date of Patent: Aug. 17, 2021

(54) INFORMATION PROCESSING APPARATUS AND NON-TRANSITORY COMPUTER READABLE MEDIUM CAPABLE OF EXTRACTING A JOB FLOW WITHOUT USE OF ATTRIBUTE INFORMATION INCLUDED IN JOB ENTRIES

(71) Applicant: FUJIFILM Business Innovation Corp., Tokyo (JP)

(72) Inventor: Shinichi Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 307 days.

(21) Appl. No.: 16/124,157

(22) Filed: Sep. 6, 2018

(65) Prior Publication Data
US 2019/0278544 A1   Sep. 12, 2019

(30) Foreign Application Priority Data

Mar. 8, 2018   (JP) .............................. JP2018-042417

(51) Int. Cl.
*G06F 3/12* (2006.01)
*H04N 1/00* (2006.01)

(52) U.S. Cl.
CPC .......... *G06F 3/1273* (2013.01); *G06F 3/1208* (2013.01); *H04N 1/00957* (2013.01)

(58) Field of Classification Search
None
See application file for complete search history.

(56) References Cited

U.S. PATENT DOCUMENTS

| 7,889,378 | B2* | 2/2011 | Shimada | G06F 21/608 358/1.16 |
| 7,965,400 | B2* | 6/2011 | Ebitani | H04N 1/32112 358/1.14 |
| 2009/0073482 | A1* | 3/2009 | Tsuchiya | G06F 3/1243 358/1.14 |
| 2011/0063672 | A1* | 3/2011 | Sugimoto | G06F 21/6254 358/1.15 |
| 2011/0161322 | A1* | 6/2011 | Shigeeda | G06Q 10/00 707/736 |

FOREIGN PATENT DOCUMENTS

JP   2008311941   12/2008

\* cited by examiner

*Primary Examiner* — Henok Shiferaw
(74) *Attorney, Agent, or Firm* — JCIPRNET

(57) ABSTRACT

An information processing apparatus includes an extraction unit that extracts two job log entries on the basis of a relationship between a first area of a common portion and a second area of a different portion. The job log entries are associated with a single job flow, and are constituted by a certain job log entry and at least one different job log entry. The common portion and the different portion are specified between an image related to the certain job log entry and an image related to the at least one different job log entry.

19 Claims, 23 Drawing Sheets

FIG. 7

| | | | | Purchasing-officer entry field | | |
|---|---|---|---|---|---|---|
| Requester seal | Superior seal | | | Purchase request No. | | |
| | | → To purchasing officer | | Person in charge | Reception date | Approval field |
| | | | | | | |

Purchase Request Form (For Development Division)

*Fill in all of the fields.

| Requester | Shinichi Kobayashi | Employee number | 11111 |
|---|---|---|---|
| Cost center code | 8 characters 22222222 | Division | Development section XX group |
| Telephone number | Outside line 000-555-6666 Extension (7-888-9999) | Floor span name | 9th floor of C building, 6 span |
| Charging division | (Only when charging division is different) | Charging cost center code | 8 characters (the same |
| Project code | 4 characters F000 | Desired delivery date | / / |

| Product name/ specification Maker specification | YYY DTTA-350840 (IDE 8 GB HDD) | | |
|---|---|---|---|
| Quantity | 1 | Check one of the units Box (B)  Pair (P)  Unit (U)  Kg (G)  m (M)  Piece (P)  (Set (S)) | |
| Budget | (Total price without consumption tax) 22,000 | Desired supplier | |

| Purchase purpose | Check one of the items Experimental research and development (01)   Others ( ) |
|---|---|
| Purchase content | Check one of the items Testing material (01)  Research and development facility 02  Commercial software 06  Others ( ) |

*Fill in only when the per-unit price is 200,000 yen or higher.

| Settlement number | | Estimate sheet No. | |
|---|---|---|---|
| Price | (Total price without consumption tax) Yen | Facility budget No. | |
| Machine type | Fill in only when the product has the machine type | Material | Fill in only when the product has the machine type |

FIG. 8

Purchase Request Form (For Development Division)

| Requester seal | Superior seal |
|---|---|
| Kobayashi | Fuji |

→ To purchasing officer

| Purchasing-officer entry field | | |
|---|---|---|
| Purchase request No. | | |
| Person in charge | Reception date | Approval field |
|  |  |  |

*Fill in all of the fields.

| | | | |
|---|---|---|---|
| Requester | Shinichi Kobayashi | Employee number | 11111 |
| Cost center code | 8 characters 22222222 | Division | Development section XX group |
| Telephone number | Outside line 000-555-6666 Extension (7-888-9999) | Floor span name | 9th floor of C building, 6 span |
| Charging division | (Only when charging division is different) | Charging cost center code | 8 characters (the same |
| Project code | 4 characters F000 | Desired delivery date | / / |

| | |
|---|---|
| Product name/ specification Maker specification | YYY DTTA-350840 (IDE 8 GB HDD) |
| Quantity | 1    Check one of the units    Box (B)   Pair (P)   Unit (U)   Kg (G)   m (M)   Piece (P)   Set (S) |
| Budget | (Total price without consumption tax) 22,000 | Desired supplier | |

| | |
|---|---|
| Purchase purpose | Check one of the items    Experimental research and development 01    Others ( ) |
| Purchase content | Check one of the items    Testing material 01   Research and development facility 02   Commercial software 06   Others ( ) |

*Fill in only when the per-unit price is 200,000 yen or higher.

| | | | |
|---|---|---|---|
| Settlement number | | Estimate sheet No. | |
| Price | (Total price without consumption tax) Yen | Facility budget No. | |
| Machine type | Fill in only when the product has the machine type | Material | Fill in only when the product has the machine type |

FIG. 9B

EXCLUDING PIXELS CORRESPONDING TO SEALS

Purchase Request Form (For Development Division)

| Requester seal | Superior seal |
|---|---|
| ◯ | ◯ |

→ To purchasing officer

| Purchasing-officer entry field ||||
|---|---|---|---|
| Purchase request No. ||||
| Person in charge | Reception date | Approval field ||
|  |  |  ||

*Fill in all of the fields.

| Requester | Shinichi Kobayashi | Employee number | 11111 |
|---|---|---|---|
| Cost center code | 8 characters<br>22222222 | Division | Development section<br>XX group |
| Telephone number | Outside line 000-555-6666<br>Extension (7-888-9999) | Floor span name | 9th floor of C building, 6 span |
| Charging division | (Only when charging division is different) | Charging cost center code | 8 characters (the same |
| Project code | 4 characters<br>F000 | Desired delivery date | / / |

| Product name/<br>specification<br>Maker specification | YYY DTTA-350840 (IDE 8 GB HDD) |
|---|---|
| Quantity | 1    Check one of the units<br>Box (B)   Pair (P)   Unit (U)   Kg (G)   m (M)   Piece (P)   (Set (S)) |
| Budget | (Total price without consumption tax)<br>22,000    Desired supplier |

| Purchase purpose | Check one of the items<br>Experimental research and development (01)    Others (    ) |
|---|---|
| Purchase content | Check one of the items<br>Testing material (01)   Research and development facility 02   Commercial software 06   Others (   ) |

*Fill in only when the per-unit price is 200,000 yen or higher.

| Settlement number |  | Estimate sheet No. |  |
|---|---|---|---|
| Price | (Total price without consumption tax)<br>Yen | Facility budget No. |  |
| Machine type | Fill in only when the product has the machine type | Material | Fill in only when the product has the machine type |

FIG. 10B

EXCLUDING CLOSED FIGURES INCLUDING SEALS

Purchase Request Form (For Development Division)

| Requester seal | Superior seal |
|---|---|
| ● | ● |

→ To purchasing officer

| Purchasing-officer entry field | | |
|---|---|---|
| Purchase request No. | | |
| Person in charge | Reception date | Approval field |
| | | |

*Fill in all of the fields.

| | | | |
|---|---|---|---|
| Requester | Shinichi Kobayashi | Employee number | 11111 |
| Cost center code | 8 characters<br>22222222 | Division | Development section<br>XX group |
| Telephone number | Outside line 000-555-6666<br>Extension (7-888-9999) | Floor span name | 9th floor of C building, 6 span |
| Charging division | (Only when charging division is different) | Charging cost center code | 8 characters (the same |
| Project code | 4 characters<br>F000 | Desired delivery date | / / |

| | | |
|---|---|---|
| Product name/<br>specification<br>Maker specification | YYY DTTA-350840 (IDE 8 GB HDD) | |
| Quantity | 1 | Check one of the units<br>Box (B)  Pair (P)  Unit (U)  Kg (G)  m (M)  Piece (P)  ⓢet (S) |
| Budget | (Total price without consumption tax)<br>22,000 | Desired supplier |

| | |
|---|---|
| Purchase purpose | Check one of the items<br>Experimental research and development ⓪1   Others (                    ) |
| Purchase content | Check one of the items<br>Testing material ⓪1  Research and development facility 02  Commercial software 06  Others (   ) |

*Fill in only when the per-unit price is 200,000 yen or higher.

| | | | |
|---|---|---|---|
| Settlement number | | Estimate sheet No. | |
| Price | (Total price without consumption tax)<br>Yen | Facility budget No. | |
| Machine type | Fill in only when the product has the machine type | Material | Fill in only when the product has the machine type |

FIG. 11B

| Purchase Request Form (For Development Division) |||||
|---|---|---|---|---|
| Requester seal | Superior seal | → To purchasing officer | Purchasing-officer entry field |||
| | | | Purchase request No. |||
| | | | Person in charge | Reception date | Approval field |
| | | | | | |

*Fill in all of the fields.

| | | | | |
|---|---|---|---|---|
| Requester | Shinichi Kobayashi | Employee number | 11111 ||
| Cost center code | 8 characters<br>22222222 | Division | Development section<br>XX group ||
| Telephone number | Outside line  000-555-6666<br>Extension   (7-888-9999) | Floor span name | 9th floor of C building, 6 span ||
| Charging division | (Only when charging division is different) | Charging cost center code | 8 characters (the same ||
| Project code | 4 characters<br>F000 | Desired delivery date | / / ||
| Product name/<br>specification<br>Maker specification | YYY DTTA-350840 (IDE 8 GB HDD) ||||
| Quantity | 1 | Check one of the units<br>Box (B)   Pair (P)   Unit (U)   Kg (G)   m (M)   Piece (P)   (Set (S)) ||||
| Budget | (Total price without consumption tax)<br>22,000 | Desired supplier |||
| Purchase purpose | Check one of the items<br>Experimental research and development (01)    Others (                  ) ||||
| Purchase content | Check one of the items<br>Testing material (01)  Research and development facility 02   Commercial software 06   Others (   ) ||||

*Fill in only when the per-unit price is 200,000 yen or higher.

| | | | |
|---|---|---|---|
| Settlement number | | Estimate sheet No. | |
| Price | (Total price without consumption tax)<br>Yen | Facility budget No. | |
| Machine type | Fill in only when the product has the machine type | Material | Fill in only when the product has the machine type |

FIG. 12B

EXCLUDING PIXELS OF FIGURE OBTAINED BY CONNECTING TWO SEALS

Purchase Request Form (For Development Division)

| Requester seal | Superior seal |
|---|---|
| ■ | |

→ To purchasing officer

| Purchasing-officer entry field ||||
|---|---|---|---|
| Purchase request No. ||||
| Person in charge | Reception date | Approval field ||
| | | | |

*Fill in all of the fields.

| Requester | Shinichi Kobayashi | Employee number | 11111 |
|---|---|---|---|
| Cost center code | 8 characters<br>22222222 | Division | Development section XX group |
| Telephone number | Outside line 000-555-6666<br>Extension (7-888-9999) | Floor span name | 9th floor of C building, 6 span |
| Charging division | (Only when charging division is different) | Charging cost center code | 8 characters (the same |
| Project code | 4 characters<br>F000 | Desired delivery date | / / |

| Product name/<br>specification<br>Maker specification | YYY DTTA-350840 (IDE 8 GB HDD) |||
|---|---|---|---|
| Quantity | 1 | Check one of the units<br>Box (B)  Pair (P)  Unit (U)  Kg (G)  m (M)  Piece (P)  (Set (S)) ||
| Budget | (Total price without consumption tax)<br>22,000 | Desired supplier ||

| Purchase purpose | Check one of the items<br>Experimental research and development (01)  Others (          ) |
|---|---|
| Purchase content | Check one of the items<br>Testing material (01)  Research and development facility 02  Commercial software 06  Others (  ) |

*Fill in only when the per-unit price is 200,000 yen or higher.

| Settlement number | | Estimate sheet No. | |
|---|---|---|---|
| Price | (Total price without consumption tax)<br>Yen | Facility budget No. | |
| Machine type | Fill in only when the product has the machine type | Material | Fill in only when the product has the machine type |

FIG. 14

KOBAYASHI SHINICHI

From: AOKI NORIKO
Sent: Monday, September 26, 2016 11:20 AM
To: YOSHIDA YOSHIHARU; KOBAYASHI SHINICHI
Subject: My number 16-009: Preliminary budget approval request Mr. Kobayashi,
The budget checking ID is My number 16-009.

--
Noriko Aoki

-----Original Message-----
From: YOSHIDA YOSHIHARU
Sent: Monday, September 26, 2016 11:02 AM
To: KOBAYASHI SHINICHI; AOKI NORIKO
Subject: Preliminary budget approval request Mr. Kobayashi, I've checked and approved your request.

To Ms. Aoki,
Please proceed the procedure for the request.

===========================================================
Yoshiharu Yoshida

FIG. 15

| \multicolumn{5}{c}{Purchase Request Form (For Development Division)} |

| Requester seal | Superior seal | | Purchasing-officer entry field | | |
|---|---|---|---|---|---|
| | | → To purchasing officer | \multicolumn{3}{l}{My number 16-009} |
| | | | Person in charge | Reception date | Approval field |
| | | | | | |

*Fill in all of the fields.

| Requester | Shinichi Kobayashi | Employee number | 11111 |
|---|---|---|---|
| Cost center code | 8 characters<br>22222222 | Division | Development section XX group |
| Telephone number | Outside line   000-555-6666<br>Extension   (7-888-9999) | Floor span name | 9th floor of C building, 6 span |
| Charging division | (Only when charging division is different) | Charging cost center code | 8 characters (the same |
| Project code | 4 characters<br>F000 | Desired delivery date | / / |

| Product name/ specification Maker specification | YYY DTTA-350840 (IDE 8 GB HDD) |
|---|---|
| Quantity | 1   Check one of the units<br>     Box (B)   Pair (P)   Unit (U)   Kg (G)   m (M)   Piece (P)   (Set (S)) |
| Budget | (Total price without consumption tax)<br>22,000   Desired supplier |

| Purchase purpose | Check one of the items<br>Experimental research and development (01)   Others (                              ) |
|---|---|
| Purchase content | Check one of the items<br>Testing material (01)  Research and development facility 02   Commercial software 06   Others (   ) |

*Fill in only when the per-unit price is 200,000 yen or higher.

| Settlement number | | Estimate sheet No. | |
|---|---|---|---|
| Price | (Total price without consumption tax)<br>Yen | Facility budget No. | |
| Machine type | Fill in only when the product has the machine type | Material | Fill in only when the product has the machine type |

FIG. 16

KOBAYASHI SHINICHI

From: AOKI NORIKO
Sent: Monday, September 26, 2016 11:20 AM
To: YOSHIDA YOSHIHARU; KOBAYASHI SHINICHI
Subject: My number 16-009: Preliminary budget approval request Mr. Kobayashi,
The budget checking ID is My number 16-009.

70

Noriko Aoki

-----Original Message-----
From: YOSHIDA YOSHIHARU
Sent: Monday, September 26, 2016 11:02 AM
To: KOBAYASHI SHINICHI; AOKI NORIKO
Subject: Preliminary budget approval request Mr. Kobayashi, I've checked and approved your request.

To Ms. Aoki,
Please proceed the procedure for the request.

==============================================================
Yoshiharu Yoshida

FIG. 17

Purchase Request Form (For Development Division) — 71

| Requester seal | Superior seal |
|---|---|
|  |  |

→ To purchasing officer

| Purchasing-officer entry field |||
|---|---|---|
| My number 16-009 |||
| Person in charge | Reception date | Approval field |
|  |  |  |

*Fill in all of the fields.

| Requester | Shinichi Kobayashi | Employee number | 11111 |
|---|---|---|---|
| Cost center code | 8 characters<br>22222222 | Division | Development section<br>XX group |
| Telephone number | Outside line   000-555-6666<br>Extension    (7-888-9999) | Floor span name | 9th floor of C building, 6 span |
| Charging division | (Only when charging division is different) | Charging cost center code | 8 characters (the same |
| Project code | 4 characters<br>F000 | Desired delivery date | / / |

| Product name/<br>specification<br>Maker specification | YYY DTTA-350840 (IDE 8 GB HDD) ||
|---|---|---|
| Quantity | 1 | Check one of the units<br>Box (B)   Pair (P)   Unit (U)   Kg (G)   m (M)   Piece (P)   (Set (S)) |
| Budget | (Total price without consumption tax)<br>22,000 | Desired supplier |
| Purchase purpose | Check one of the items<br>Experimental research and development (01)   Others (                ) ||
| Purchase content | Check one of the items<br>Testing material (01)  Research and development facility 02   Commercial software 06   Others (   ) ||

*Fill in only when the per-unit price is 200,000 yen or higher.

| Settlement number |  | Estimate sheet No. |  |
|---|---|---|---|
| Price | (Total price without consumption tax)<br>Yen | Facility budget No. |  |
| Machine type | Fill in only when the product has the machine type | Material | Fill in only when the product has the machine type |

INFORMATION PROCESSING APPARATUS AND NON-TRANSITORY COMPUTER READABLE MEDIUM CAPABLE OF EXTRACTING A JOB FLOW WITHOUT USE OF ATTRIBUTE INFORMATION INCLUDED IN JOB ENTRIES

CROSS-REFERENCE TO RELATED APPLICATIONS

This application is based on and claims priority under 35 USC 119 from Japanese Patent Application No. 2018-042417 filed Mar. 8, 2018.

BACKGROUND

(i) Technical Field

The present disclosure relates to an information processing apparatus and a non-transitory computer readable medium.

(ii) Related Art

There is a function of registering, as a job flow, multiple jobs used frequently, to achieve operational efficiency. For example, Japanese Unexamined Patent Application Publication No. 2008-311941 describes a method of generating a new job flow in response to user operations by extracting settings information of some jobs in accordance with a process from a history of executed jobs and combining the extracted information.

SUMMARY

When an image is read as data from a sheet or the like, if information (for example, a file name) specifying the image is not printed on the sheet or the like, a job of reading the image and a job of printing a corresponding image fail to be extracted together as a job flow.

Aspects of non-limiting embodiments of the present disclosure relate to extraction of a job flow without use of attribute information included in job log entries.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an extraction unit that extracts two job log entries on the basis of a relationship between a first area of a common portion and a second area of a different portion. The two job log entries are associated with a single job flow, and are constituted by a certain job log entry and at least one different job log entry. The common portion and the different portion are specified between an image related to the certain job log entry and an image related to the at least one different job log entry.

BRIEF DESCRIPTION OF THE DRAWINGS

Exemplary embodiments of the present disclosure will be described in detail based on the following figures, wherein:

FIG. 7 is a diagram illustrating an exemplary original image that is output in a print job;

FIG. 8 is a diagram illustrating an exemplary scan image obtained in a scan job;

FIGS. 9A and 9B are diagrams for describing an example in which the area of a common portion, which is illustrated in FIG. 9B, and the area of a different portion, which is illustrated in FIG. 9A, are obtained in pixels;

FIGS. 10A and 10B are diagrams for describing an example in which the area of a common portion, which is illustrated in FIG. 10B, and the area of a different portion, which is illustrated as closed figures in FIG. 10A, are obtained by using the closed figures including the different portion;

FIGS. 11A and 11B are diagrams for describing another example in which the area of a common portion, which is illustrated as another example in FIG. 11B, and the area of a different portion, which is illustrated as another exemplary closed figure in FIG. 11A, are obtained by using the closed figure including the different portion;

FIGS. 12A and 12B are diagrams for describing another example in which the area of a common portion, which is illustrated as another example in FIG. 12B, and the area of a different portion, which is illustrated as another exemplary closed figure in FIG. 12A, are obtained by using the closed figure including the different portion;

FIG. 14 is a diagram illustrating an exemplary original image that is output in a print job;

FIG. 15 is a diagram illustrating another exemplary original image that is output in a print job;

FIG. 16 is a diagram for describing the position of common information specifying the content described in a mail-format original image;

FIG. 17 is a diagram for describing the position of common information specifying the content described in an application-format original image;

DETAILED DESCRIPTION

Figure 1:
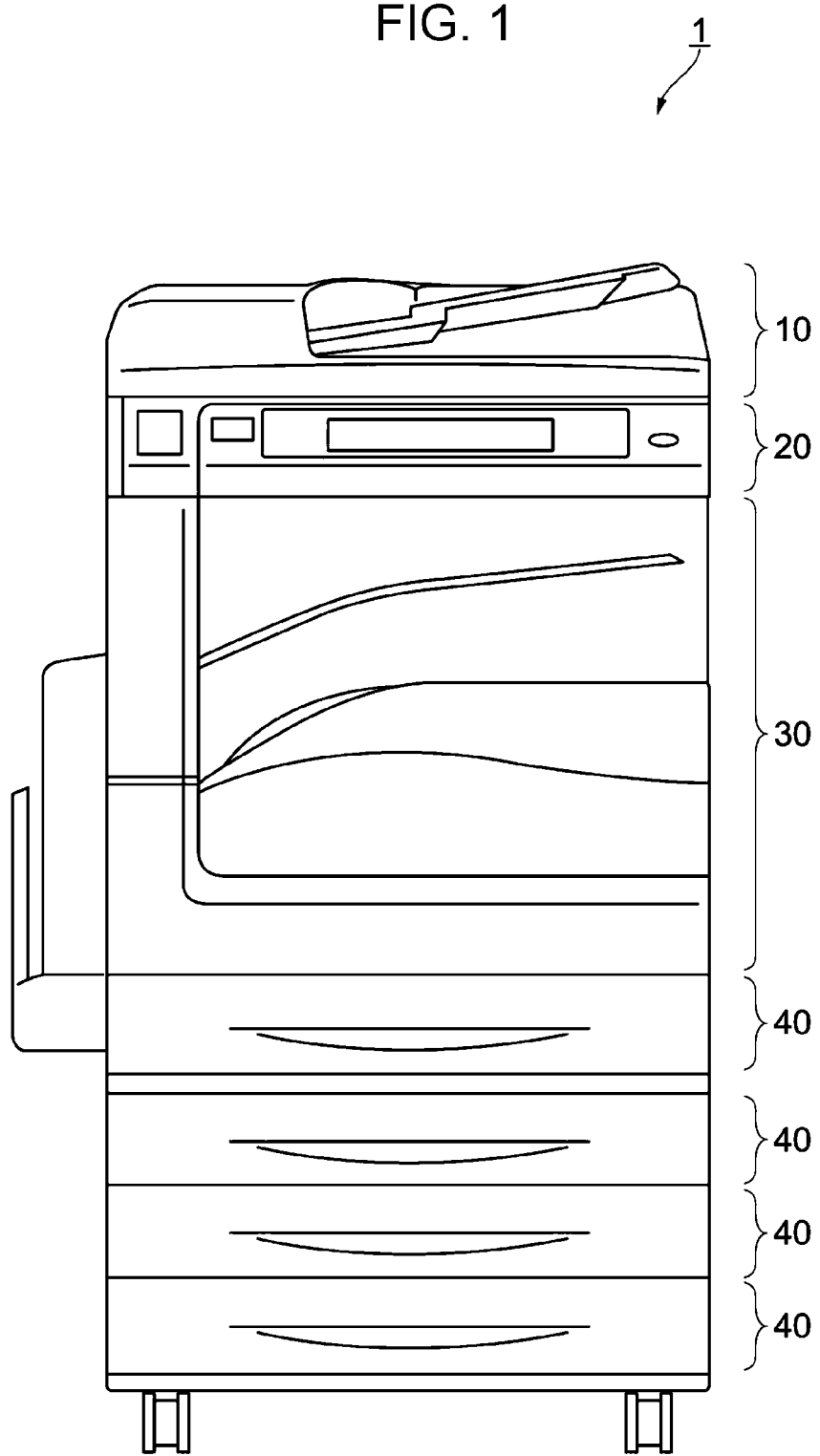
FIG. 1 is a diagram illustrating a configuration example of the appearance of an image forming apparatus according to an exemplary embodiment.

An exemplary embodiment of the present disclosure will be described below by referring to the drawings.

Overall Configuration

FIG. 1 is a diagram illustrating a configuration example of the appearance of an image forming apparatus 1 according to the exemplary embodiment. The image forming apparatus 1 is an exemplary information processing apparatus.

The image forming apparatus 1 illustrated in FIG. 1 forms an image on recording material such as a sheet, and has, for example, a copy function, a scanner function, a fax reception/transmission function, and a print function.

However, the image forming apparatus 1 does not necessarily have all of these functions, and may specialize in any one of the functions. An apparatus specializing in a single function is called, for example, a copier, a scanner, a facsimile, or a printer (including a three-dimensional printer).

The image forming apparatus 1 includes an image reading apparatus 10 that reads a document image, a user interface unit 20 that receives operation input from a user and displays various information to a user, an image recording apparatus 30 that records an image on recording material, and accommodating units 40 that accommodate recording material. The number of accommodating units 40 is any.

Figure 2:
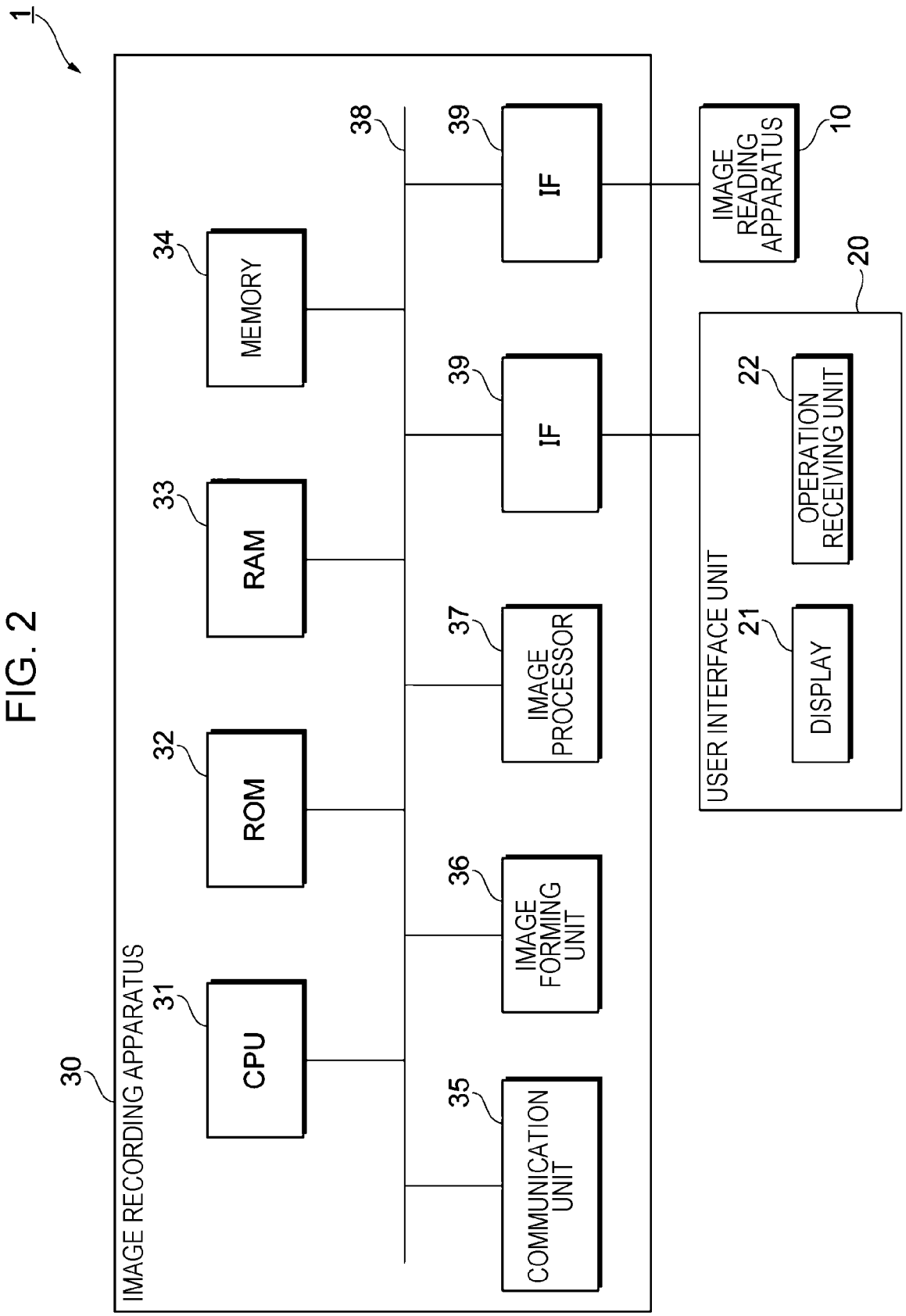
FIG. 2 is a diagram illustrating an exemplary hardware configuration of an image recording apparatus according to the exemplary embodiment.

FIG. 2 is a diagram illustrating an exemplary hardware configuration of the image recording apparatus 30 according to the exemplary embodiment.

The image recording apparatus 30 includes a central processing unit (CPU) 31, a read only memory (ROM) 32, a random access memory (RAM) 33, a memory 34, a communication unit 35, an image forming unit 36, and an image processor 37. The CPU 31 controls the units through execution of programs. The ROM 32 is used to record programs, such as a basic input output system (BIOS) and firmware. The RAM 33 is used as an area for execution of programs. The memory 34 is used for storage of image data and the like. The communication unit 35 is used for communication with external apparatuses connected over a network. The image forming unit 36 forms an image on a sheet, which is exemplary recording material, for example, by using the electrophotographic system or the inkjet system. The image processor 37 performs image processing, such as color correction and scale correction, on image data.

The CPU 31, the ROM 32, and the RAM 33 are included in a so-called computer.

The units described above are connected to each other through a bus 38. The image reading apparatus 10 and the user interface unit 20 are connected to the bus 38 through interfaces (IFs) 39.

The image reading apparatus 10, which is a so-called scanner, optically reads a document image and generates scan data.

The user interface unit 20 includes a display 21 and an operation receiving unit 22. The display 21 is used to display an operation screen and to display an image and the like which are to be processed. The operation receiving unit 22 receives a user operation.

The display 21 includes, for example, a liquid-crystal display panel or an organic electro luminescence (EL) display panel, and displays a user interface screen.

The operation receiving unit 22 is an input device that receives a user operation, and includes, for example, buttons, switches, a touch panel, and the like.

Figure 3:
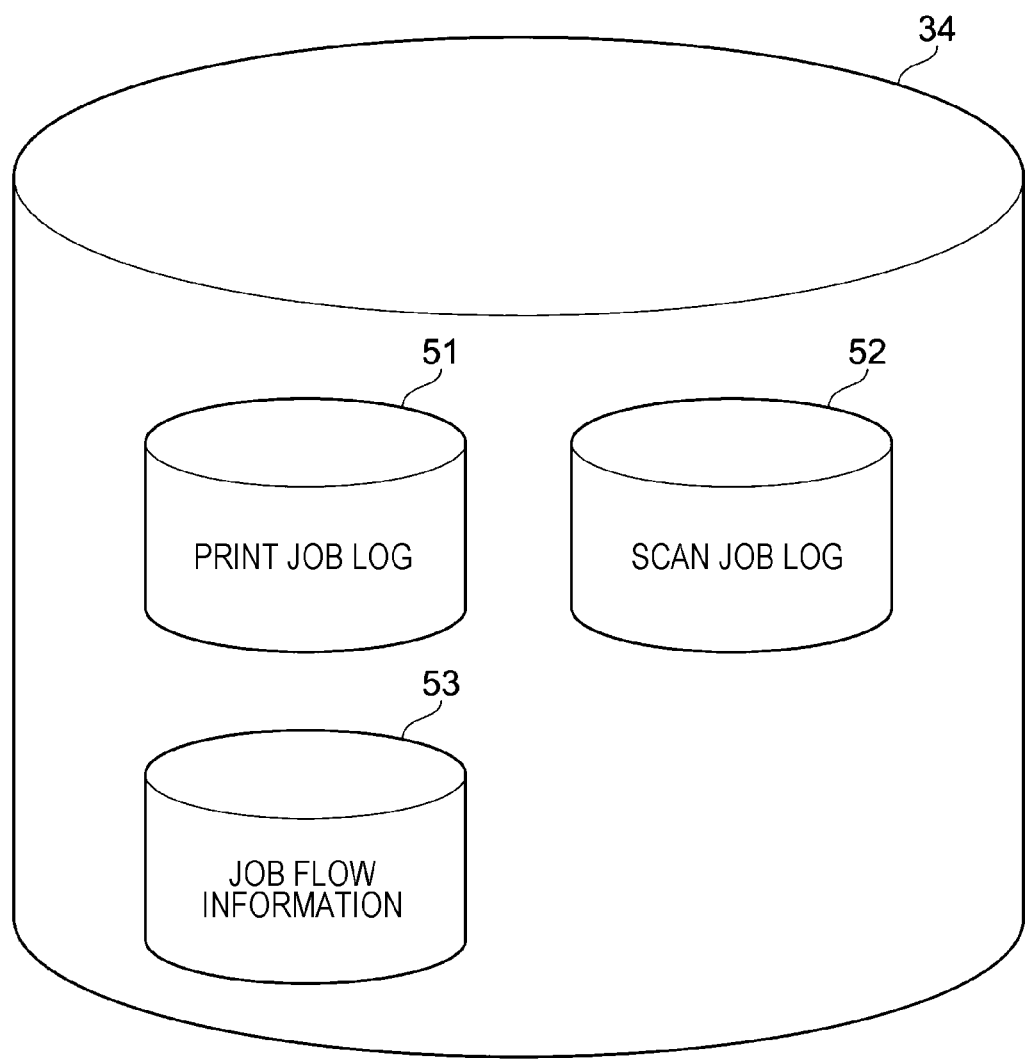
FIG. 3 is a diagram illustrating exemplary management data stored in a memory.

FIG. 3 is a diagram illustrating exemplary management data stored in the memory 34.

In the exemplary embodiment, for example, a print job log 51, a scan job log 52, and job flow information 53 are stored as management data.

The print job log 51 and the scan job log 52 are exemplary job logs. Other examples of a job log include a copy job log, a facsimile-transmission job log, a facsimile-reception job log, and a transfer job log.

Link information indicating the storage location of image data associated with the job, and settings information used in execution of the job are attached to a job log entry. The link information includes a path name, a file name, or a uniform resource locator (URL) which indicates a storage location. The settings information includes information defining details of operations, such as execution conditions.

Figure 4:
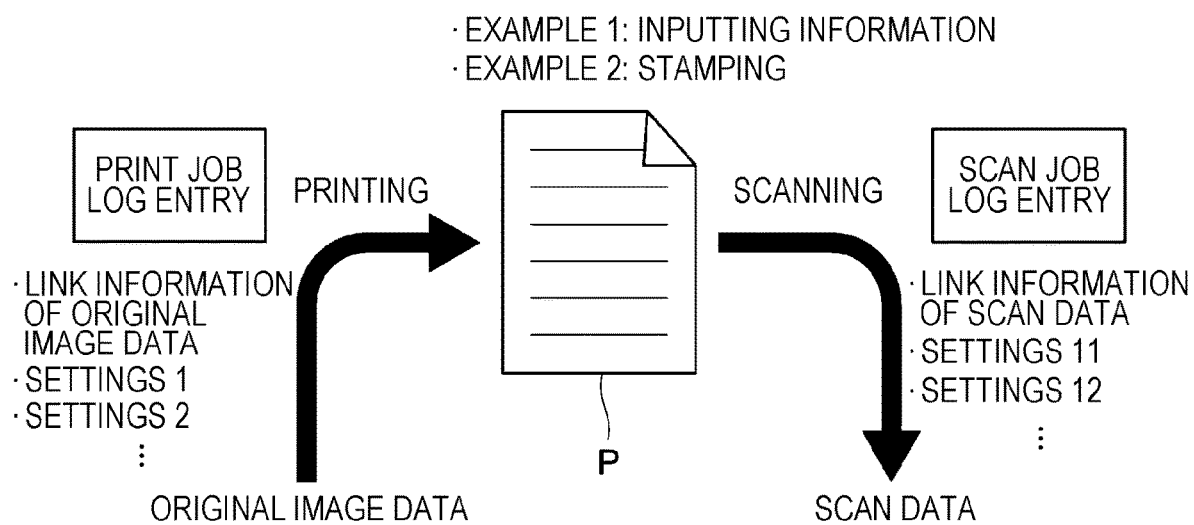
FIG. 4 is a diagram for describing exemplary job log entries.

FIG. 4 is a diagram for describing exemplary job log entries.

FIG. 4 indicates a series of operations. In the operations, necessary items are filled in on a sheet P on which the image recording apparatus 30 (see FIG. 1) has printed an image corresponding to original image data. Then, the sheet P on which the necessary items have been filled in is optically read by using the image reading apparatus 10 (see FIG. 1). In FIG. 4, as an example of filling in the necessary items, inputting information and stamping are illustrated.

On the sheet P, information about original image data (the storage location, the file name, and the like of the original image data) is not printed.

Therefore, even if the characters printed on the sheet P are read by using an optical character recognition (OCR) technique, it is not possible to identify the original image data.

In a print job log entry, link information of the original image data and settings information used in printing are recorded. The link information of original image data includes, for example, the storage location and the file name of the original image data. The settings information used in printing includes, for example, the sheet size, the orientation of a document, information about whether single-sided printing or duplex printing was used, information about whether color printing or monochrome printing was used, the number of pages assigned to one sheet, the print density, and information about whether a document or a photograph was printed.

In a scan job log entry, link information of scan data generated by the image reading apparatus 10 and settings information used in scanning are recorded. The link information of scan data includes the storage location and the file name of the scan data. The settings information used in scanning includes, for example, information about the image quality adjustment, the reading method, and the output format.

Functional Configuration

Figure 5:
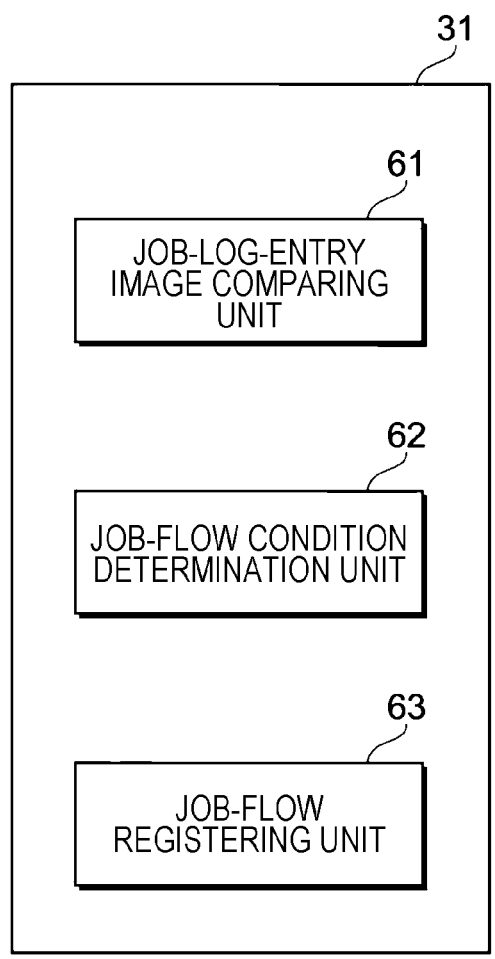
FIG. 5 is a diagram illustrating an exemplary functional configuration implemented through execution of programs performed by a central processing unit (CPU) serving as a controller.

FIG. 5 is a diagram illustrating an exemplary functional configuration implemented through execution of programs which is performed by the CPU 31 (see FIG. 2) serving as a controller.

The functions illustrated in FIG. 5 are prepared to extract multiple job log entries which do not include the same link information but which are associated with each other.

The CPU 31 functions as a job-log-entry image comparing unit 61, a job-flow condition determination unit 62, and a job-flow registering unit 63. The job-log-entry image comparing unit 61 compares the image related to a job log entry determined as a process target, with the image related to another job log entry. The job-flow condition determination unit 62 determines whether or not the comparison result satisfies a predetermined condition. The job-flow registering unit 63 extracts, for registration, a job flow from job log entries related to two images satisfying the condition.

The job-log-entry image comparing unit 61 and the job-flow condition determination unit 62 are exemplary extraction units.

The job-log-entry image comparing unit 61 specifies a common portion and a different portion between two images, and obtains the areas of the specified portions.

In the exemplary embodiment, the area of a common portion is referred to as a first area, and the area of a different portion is referred to as a second area.

There are several methods, whose examples will be described below, of specifying a common portion and a different portion. The examples include a method of specifying portions in pixels, and a method using a closed figure including the different portion.

The job-flow condition determination unit 62 determines whether or not operational relevance between two job log entries is recognized on the basis of the relationship between the area of the common portion and the area of the different portion in two images obtained for a job flow.

In the exemplary embodiment, examples of operations between which relevance is recognized include a procedure of handling the same sheet, such as an operation of printing an application sheet and an operation of scanning the sheet on which items have been filled in. This example has relevance in operational order (flow).

In addition, examples of operations between which relevance is recognized include operations in which relevance is recognized between described pieces of information even though the formats have different appearances, such as an operation of receiving a fax about an order form and an operation of printing pieces of mail which have been received/transmitted from/to a fax transmitter and which are about the order. This example has relevance in terms of the content.

In the exemplary embodiment, to extract job log entries having relevance in operational order (flow), the condition that the ratio of the area (second area) of a different portion to the area (first area) of a common portion is equal to or less than a predetermined threshold is used.

As the threshold is smaller, job log entries handling images having higher similarity may be extracted. In contrast, if the threshold is too small, job log entries handling images having high operational relevance are hardly extracted. Therefore, an empirically determined value is used as the threshold.

In the exemplary embodiment, to extract job log entries in which pieces of described information match each other, the condition that the ratio of the area (first area) of a common portion to the area (second area) of a different portion is equal to or less than a predetermined threshold, and that pieces of information specifying the content described in the images are the same (match each other) is used.

The information specifying the described content is, for example, a string issued for a procedure such as an application. Documents created in association with a single application are highly likely to have a common item which needs to be filled in, even though the documents have different layouts or the like.

In the exemplary embodiment, to extract information specifying the described content in terms of appearance, for example, it is determined whether or not there is a combination of characters, whose number is a predetermined number or greater, of predetermined types. For example, it is required that a common string which appears in two images is described in a predetermined format. Examples of the predetermined format include a format having a patterned portion in which characters are to be replaced, such as "YYYYMMDD—XXX" (date—any three-digit number) and "Sales division—XXX" (division name—any three-digit number), and a format described in a regular expression.

In addition, in the exemplary embodiment, to extract information specifying the described content in terms of appearance, for example, it is required that information specifying a legal person or a natural person be not included. The example of a regular expression, which is described above, also satisfies this condition. Information specifying a legal person or a natural person is not information specifying the described content, and is a string used frequently in documents having no relevance.

The job-flow registering unit 63 generates, for registration, a job flow by combining a pair of jobs corresponding to two job log entries between which operational relevance is recognized, with settings information attached to the job log entries. That is, the execution order of multiple jobs, between which operational relevance is recognized, and settings information, which is referred to in the jobs, are registered as a single job flow. The number of jobs included in a job flow is not limited to two.

Job Flow Registration Process

A job flow registration process performed by the image forming apparatus 1 (see FIG. 1) will be described.

The registration process is implemented by the job-log-entry image comparing unit 61 (see FIG. 5), the job-flow condition determination unit 62 (see FIG. 5), and the job-flow registering unit 63 (see FIG. 5) which are described above.

Figure 6:
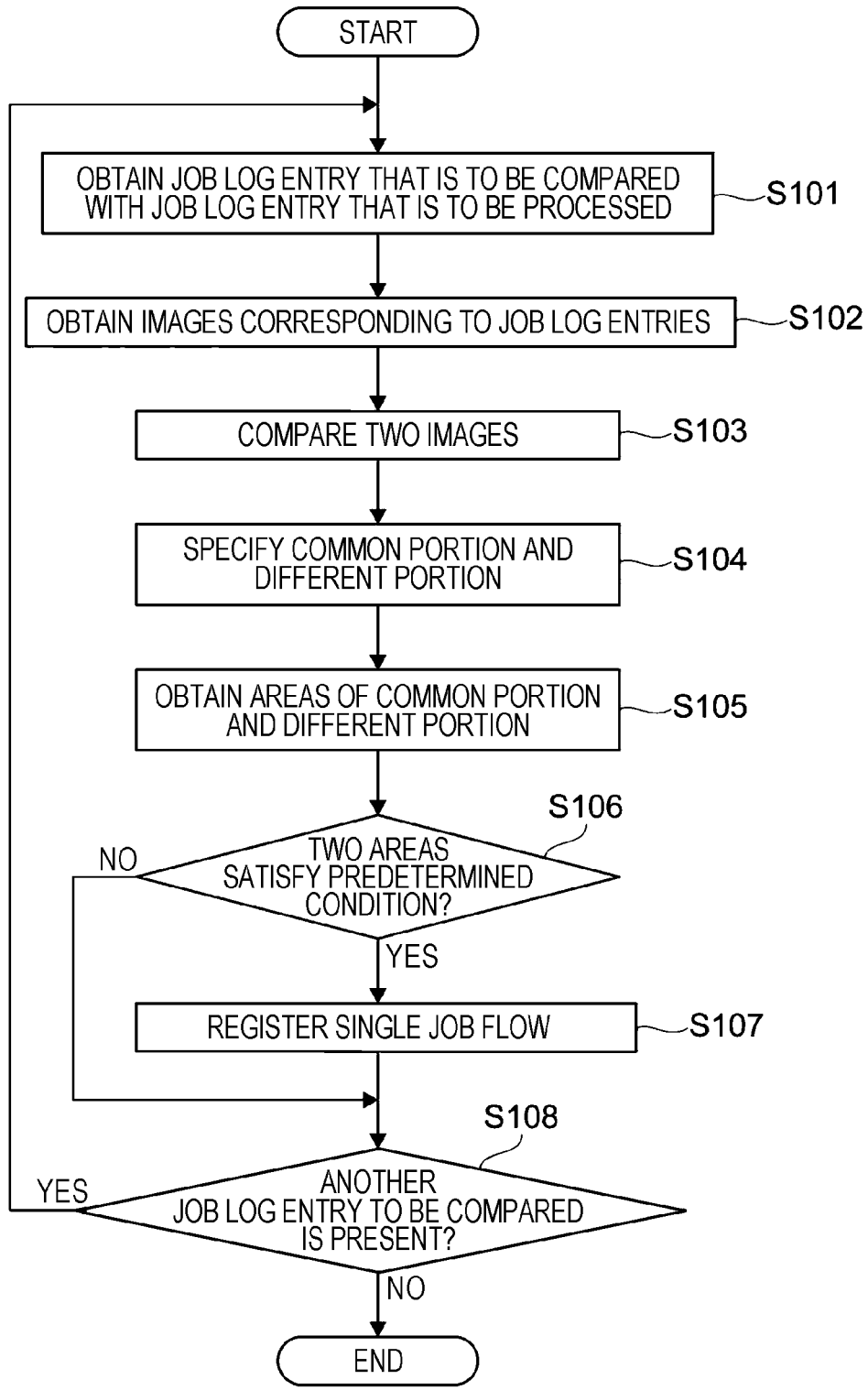
FIG. 6 is a flowchart of an exemplary job flow registration process according to the exemplary embodiment.

FIG. 6 is a flowchart of an exemplary job flow registration process according to the exemplary embodiment. In FIG. 6, the symbol "S" indicates a step.

The job-log-entry image comparing unit 61 obtains a job log entry that is to be compared with a job log entry that is to be processed (step 101). The job log entries are extracted from the memory 34 (see FIG. 3).

The job-log-entry image comparing unit 61 obtains images corresponding to the job log entries (step 102). The images corresponding to the job log entries are read from the respective pieces of link information.

After that, the job-log-entry image comparing unit 61 compares the two obtained images with each other (step 103). The comparison is performed, for example, after the sizes and the resolutions of the images (sheet portions) are adjusted. Prior to the comparison, for example, preprocessing of removing noise is also performed.

Then, the job-log-entry image comparing unit 61 specifies a common portion and a different portion between the two images that are to be compared with each other (step 104).

FIGS. 7 and 8 illustrate an example of two images that are to be compared with each other.

FIG. 7 is a diagram illustrating an exemplary original image that is output in a print job. This example illustrates a purchase request form in which, for example, stamp fields (input fields) for the requester and the superior are blank.

In the example in FIG. 7, entry fields (input fields), in which information such as an applicant is surrounded with frame borders, have been filled in. However, these items may be blank. In the example in FIG. 7, a routine document, in which entry fields (input fields) surrounded with frame borders are arranged, is assumed. However, an original image assumed in the exemplary embodiment is not necessarily limited to a routine document. For example, a document that does not have an entry field or a stamp field surrounded with a frame border may be used.

FIG. 8 is a diagram illustrating an exemplary scan image obtained in a scan job. The scan image illustrated in FIG. 8 is different from the original image illustrated in FIG. 7 in that stamps are added in the stamp fields for the requester and the superior. In FIG. 8, a region having a portion different from the original image is surrounded with a broken line.

In the example in FIGS. 7 and 8, description is made under the assumption that a document used in request is used. However, documents used at the time points of approval, registration, subcontracting, round robin decision making, billing, preparing a quotation, placing an order, delivery, and accepting delivery may be used.

Back to FIG. 6, the job-log-entry image comparing unit 61 (see FIG. 5) obtains the areas of the common portion and the different portion specified between the images (step 105).

FIGS. 9A to 12B illustrate examples of obtaining the areas. Any method described below may be used.

Figure 9A:
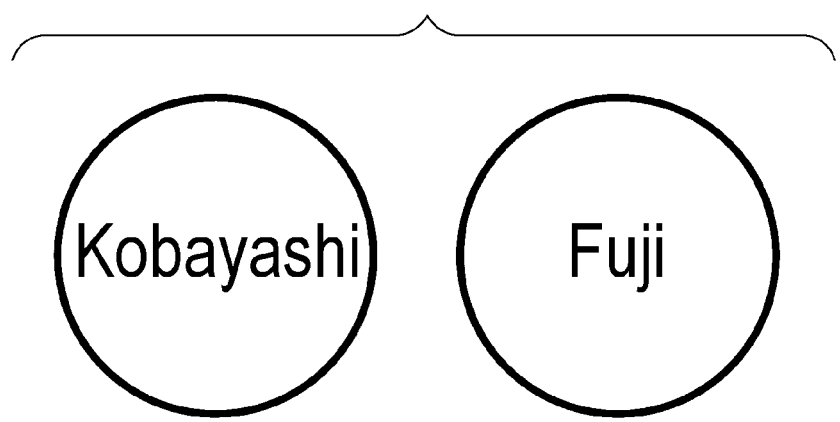

FIGS. 9A and 9B are diagrams for describing an example in which the area of a common portion and the area of a different portion are obtained in pixels. FIG. 9A illustrates the different portion. FIG. 9B illustrates the common portion.

In the method illustrated in FIGS. 9A and 9B, the area of the different portion is calculated on the basis of the number of pixels included in the characters and the line segments forming the stamp seals.

The area is obtained as a value by multiplying the area of a pixel by the number of pixels. Alternatively, the number of pixels may be handled as the area. In FIGS. 9A and 9B, the area of the different portion is calculated as the sum of the areas corresponding to the stamp seals. The area of the common portion is calculated on the other pixels obtained by excluding the pixels corresponding to the stamp seals.

Figure 10A:
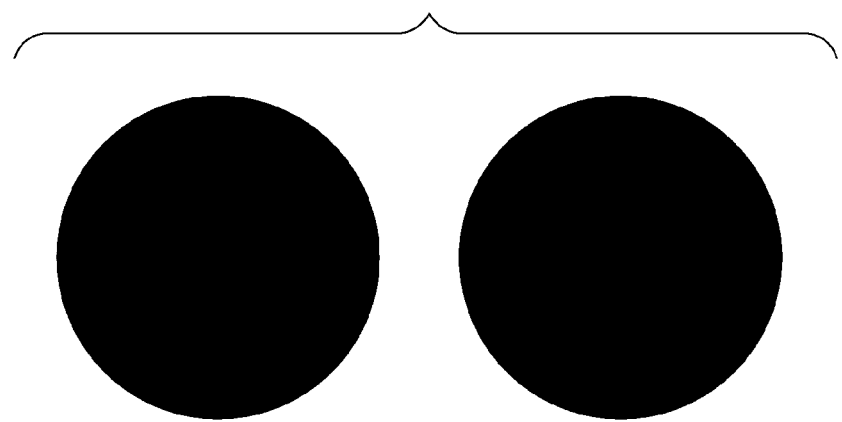

FIGS. 10A and 10B are diagrams for describing an example in which the area of a common portion and the area of a different portion are obtained by using closed figures including the different portion. FIG. 10A illustrates the closed figures handled as the different portion. FIG. 10B illustrates the common portion.

In the method illustrated in FIGS. 10A and 10B, the area of the different portion is calculated by using closed figures which each provide a circle indicating the outer edge of a stamp seal. In this case, the entire area in the circle is handled as the different portion. In FIGS. 10A and 10B, a circle circumscribing a stamp seal is used. However, a circle or a rectangle including a stamp seal may be used. In this case, the area of the common portion is calculated as a value obtained by excluding the area of the closed figures.

Figure 11A:

FIGS. 11A and 11B are diagrams for describing another example in which the area of a common portion and the area of a different portion are obtained by using a closed figure including the different portion. FIG. 11A illustrates another exemplary closed figure handled as the different portion. FIG. 11B illustrates another example of the common portion.

In the method illustrated in FIGS. 11A and 11B, the area of the different portion is calculated by using stamp fields (fields surrounded with frame borders) including stamp seals detected as the different portion. In the example in FIGS. 11A and 11B, the two stamp fields are adjacent to each other. Therefore, the area of the rectangle is obtained as the area of the different portion. In this case, the area of the common portion is calculated as the value obtained by excluding the area of the rectangle which is a closed figure.

Figure 12A:

FIGS. 12A and 12B are diagrams for describing another example in which the area of a common portion and the area of a different portion are obtained by using a closed figure including the different portion. FIG. 12A illustrates another exemplary closed figure handled as the different portion. FIG. 12B illustrates another example of the common portion.

In the method illustrated in FIGS. 12A and 12B, the area of the different portion is calculated by using a closed figure obtained by connecting the outer edges of two stamp seals detected as the different portion. In the example in FIGS. 12A and 12B, the area of the different portion is obtained as the area of an oval obtained by connecting the outer edges of the two stamp seals. In this case, the area of the common portion is calculated as the value obtained by excluding the area of the oval which is a closed figure. Instead of an oval obtained by connecting the outer edges of two stamp seals, an oval including the two stamp seal may be used.

Back to FIG. 6, the job-flow condition determination unit 62 (see FIG. 5) determines whether or not the two obtained areas satisfy the predetermined condition (step 106).

Figure 13:
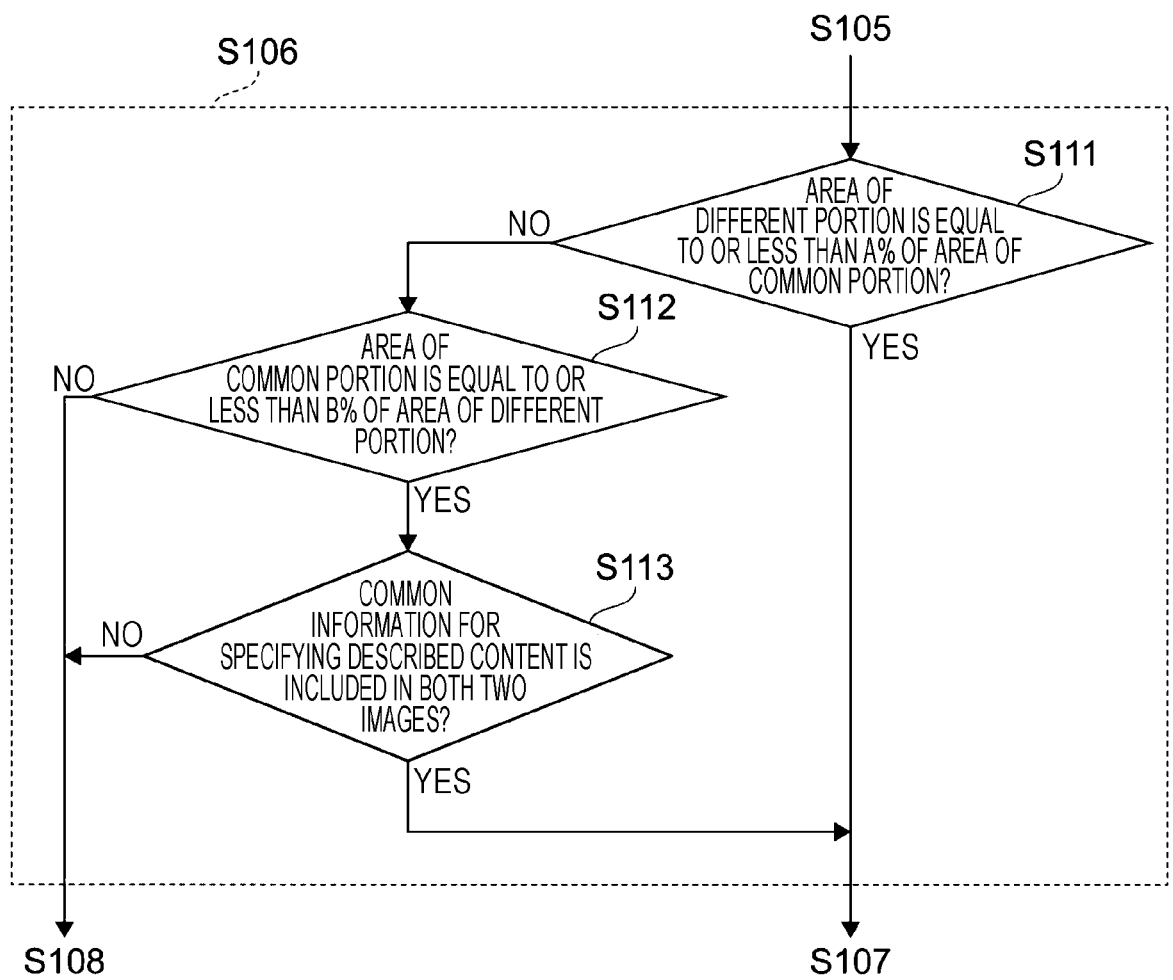
FIG. 13 is a flowchart of an exemplary process performed by a job-flow condition determination unit according to the exemplary embodiment.

FIG. 13 is a flowchart of an exemplary process performed by the job-flow condition determination unit 62 according to the exemplary embodiment. In FIG. 13, the symbol "S" indicates a step.

The job-flow condition determination unit 62 determines whether or not the area of the different portion is equal to or less than A % of the area of the common portion (step 111). In this example, A % indicates a value as a threshold.

If the positive result is obtained in step 111, the job-flow condition determination unit 62 causes the process to proceed to step 107. In this case, the images that correspond to the two job log entries and that are to be compared with each other may be regarded as being substantially the same.

If the negative result is obtained in step 111, the job-flow condition determination unit 62 determines whether or not the area of the common portion is equal to or less than B % of the area of the different portion (step 112). In this example, B % indicates a value as a threshold. For example, zero may be used as the threshold. In the exemplary embodiment, a printed character may be present at the same pixel. Therefore, a non-zero value is set as the threshold.

The process in step 112 is used to find such jobs that, though there is hardly a common portion between the images, the jobs correspond to operations between which relevance is recognized. Therefore, images in which any commonality is recognized (images for which the negative result is obtained in step 112) are not images intended to be found in step 112.

Therefore, if the negative result is obtained in step 112, the job-flow condition determination unit 62 causes the process to proceed to step 108.

In contrast, if the positive result is obtained in step 112, the job-flow condition determination unit 62 determines whether or not common information specifying the described content is included in both the two images (step 113). The common information indicates a string, which satisfies the condition, among strings obtained through an OCR process.

By using FIGS. 14 to 17, the determination in step 112 will be described.

FIG. 14 is a diagram illustrating an exemplary original image that is output in a print job. The original image is a history of mail received/transmitted between persons concerned, in the course of an application process.

FIG. 15 is a diagram illustrating another exemplary original image that is output in a print job. The original image corresponds to an image obtained by transcribing the information (see FIG. 14) received/transmitted in mail, onto the application form.

No commonality in format is recognized between the original image (see FIG. 14) indicating a description in a mail format and the original image (see FIG. 15) in an application format. Therefore, even though the same person's name and the like are included in both the original images, the arrangement is different.

However, even though the description formats are totally different from each other, in comparison in pixels, a printed dot may be present at the same pixel of the two images.

Therefore, B % used in step 112 (see FIG. 13) is defined in consideration of a coincidence.

FIG. 16 is a diagram for describing the position of common information specifying the content described in the mail-format original image (see FIG. 14).

FIG. 17 is a diagram for describing the position of the common information specifying the content described in the application-format original image (see FIG. 15).

In the original image in FIG. 16, a description of "my number 16-009" is recognized at the position of a portion surrounded with a frame border 70. In the original image in FIG. 17, a description of "my number 16-009" is recognized at the position of a portion surrounded with a frame border 71.

In the case of FIG. 16, the description of "my number 16-009" appears as a part of text. In contrast, in the case of FIG. 17, the description of "my number 16-009" appears in one of the item fields which constitutes a part of the format.

The string, "my number 16-009", is an exemplary string issued from the system for the application procedure. Thus, the string, "my number 16-009", indicates correspondence with a certain procedure. Therefore, images in which the common special string is present are highly likely to have relevance even though the jobs are different from each other.

The exemplary embodiment is made under the condition that a string indicating common information is described in a predetermined format.

An example of the condition is that the string is described in a combination of characters, whose number is the predetermined number or greater, of predetermined types (for example, katakana characters, symbols, and numbers). In other words, a portion in which characters are to be replaced is described, for example, in a patterned format or a format described in a regular expression. Information specifying a legal person or a natural person is not handled as common information.

Back to FIG. 13, if the negative result is obtained in step 113, the job-flow condition determination unit 62 causes the process to proceed to step 108.

In contrast, if the positive result is obtained in step 113, the job-flow condition determination unit 62 causes the process to proceed to step 107.

Back to FIG. 6, if the positive result is obtained in step 106 described in detail by using FIG. 13, the job-flow registering unit 63 (see FIG. 5) associates, with a single job flow, the job log entries corresponding to the two images that are comparison targets, and registers the job flow (step 107).

A job flow is used as a template. Therefore, the types of the jobs and the settings information are extracted from the job flow, and are registered as a job flow.

After that, the job-flow registering unit 63 determines whether or not another job log entry to be compared is present (step 108).

If the positive result is obtained in step 108, the process returns to step 101. In contrast, if the negative result is obtained in step 108, the process ends.

Figure 18:
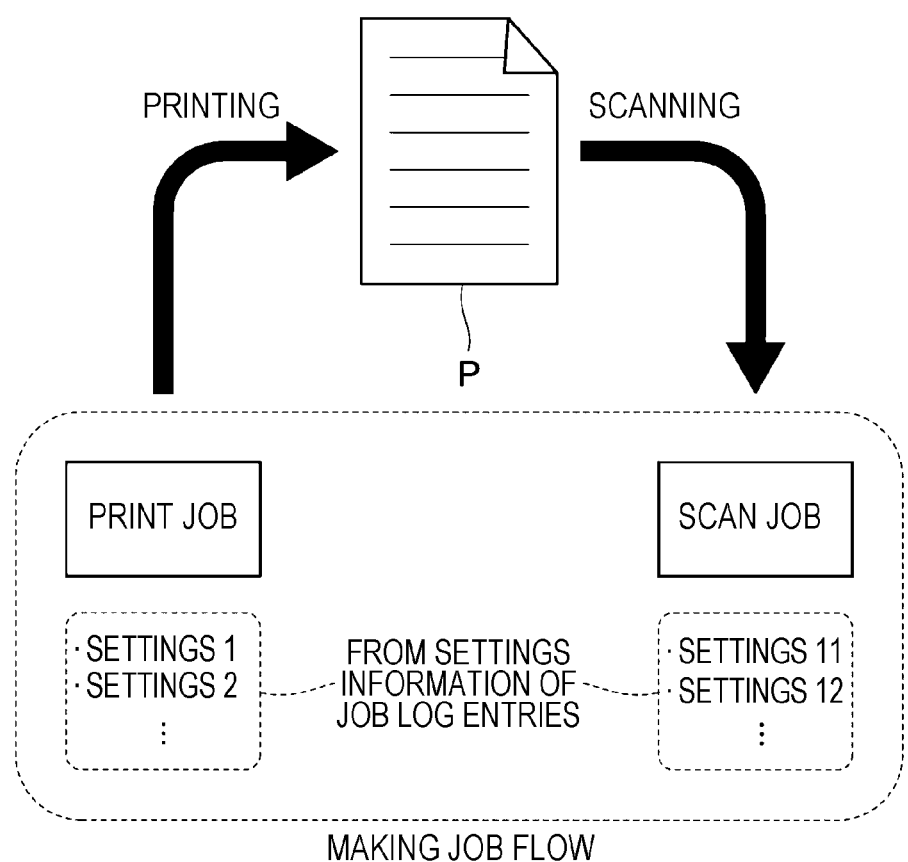
FIG. 18 is a diagram illustrating an example which conceptually describes registration of a job flow according to the exemplary embodiment.

FIG. 18 is a diagram illustrating an example for conceptually describing registration of a job flow according to the exemplary embodiment.

The example in FIG. 18 corresponds to the case in which, even though link information is not the same, two images to be compared with each other are substantially the same and relevance is recognized. Specifically, this indicates an example of the case in which the positive result is obtained in step 111 (see FIG. 13).

In this case, jobs performed sequentially on the sheet P having no attribute information (that is, a print job and a scan job) may be registered as a single job flow. As a matter of course, as settings information, the settings information (settings 1, settings 2, and so on) recorded in the print job log entry and the settings information (settings 11, settings 12, and so on) recorded in the scan job log entry are used.

The registration of a job flow makes a setting operation before printing and a setting operation before scanning unnecessary.

Figure 19A:
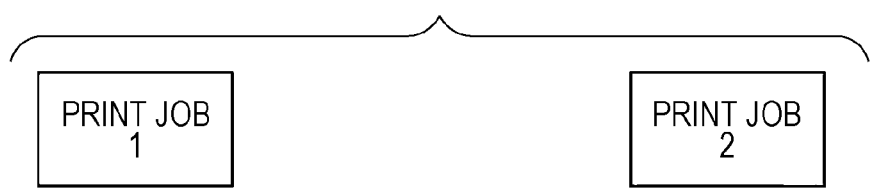
FIG. 19A is a diagram illustrating a second example which conceptually describes registration of a job flow according to the exemplary embodiment and which is obtained when no common information is present in unsimilar images.
Figure 19B:
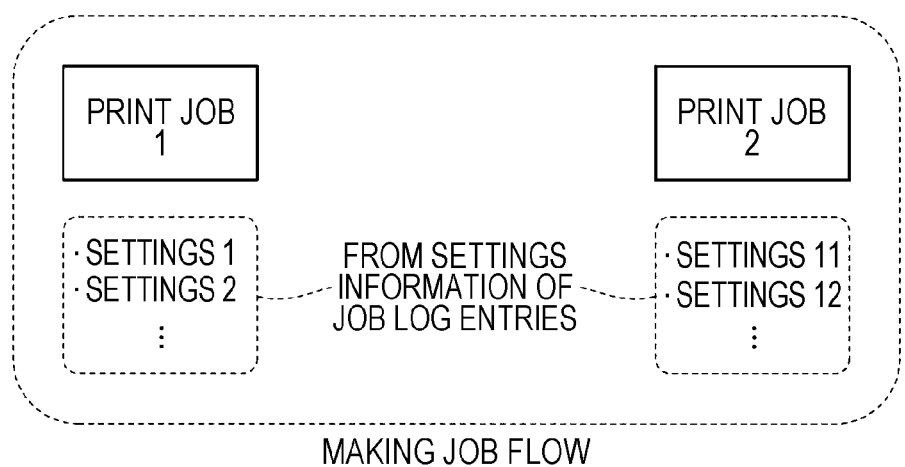
FIG. 19B is a diagram illustrating the second example obtained when common information is present in unsimilar images.

FIGS. 19A and 19B are diagrams illustrating another example for conceptually describing registration of a job flow according to the exemplary embodiment. FIG. 19A illustrates an example of the case in which no common information is present in unsimilar images. FIG. 19B illustrates an example of the case in which common information is present in unsimilar images.

The case in FIGS. 19A and 19B corresponds to the case in which, even though link information is not the same and two images to be compared with each other are unsimilar, common information is recognized in both the two images. Specifically, this indicates an exemplary case in which the positive result is obtained in step 113 (see FIG. 13).

As described above, in the example in FIGS. 19A and 19B, a print job on mail and a print job on a document newly created with reference to the content in the mail are assumed.

In this case, even though the print jobs have attribute information, the same link information is not present. Therefore, the method using link information has difficulty in registering the jobs as a single job flow.

In the exemplary embodiment, when procedural relevance is recognized by using common information (in the case of FIG. 19B), jobs in which the same content is printed in different formats may be registered as a single job flow. As a matter of course, as the settings information, the settings information (settings 1, settings 2, and so on) recorded in the log entry of the print job 1 and the settings information (settings 11, settings 12, and so on) recorded in the log entry of the print job 2 are used.

The registration of a job flow makes a setting operation before printing mail and a setting operation before printing an application document unnecessary.

When common information is not found in two images (in the case of FIG. 19A), the jobs corresponding to the two images are not registered as a job flow.

Other Embodiments

The exemplary embodiment of the present disclosure is described above. The technical scope of the present disclosure is not limited to the scope of the exemplary embodiment described above. It is clear, from the claims, that embodiments obtained by adding various changes and improvements to the above-described exemplary embodiment are encompassed in the technical scope of the present disclosure.

For example, in the exemplary embodiment described above, the case in which a print job of printing a document having input fields and a scan job are registered as a job flow on the basis of the print job and a scan image in which stamp seals have been added to the printed sheet is described. Alternatively, added information may be handwritten characters or symbols, instead of a stamp seal. For example, added information may be a check symbol in a check box.

The job flow made in the above-described exemplary embodiment is exemplary. For example, a fax transmission job, a fax reception job, a mail distribution job, a server storage job, and a PC storage job may be included in a combination for a job flow.

In the exemplary embodiment described above, the image forming apparatus 1 having a print function and a scan function is used as an exemplary information processing apparatus. For example, a portable information processing apparatus such as a smartphone may be used. For example, in the case of a smartphone, the present disclosure may be applied to the case in which an operation (job) of giving an instruction to print an image and an operation (job) of photographing, by using a camera, a sheet on which information has been input in the printed image are registered as a job flow.

In the exemplary embodiment described above, a job flow is registered in the image forming apparatus 1, with which, for example, a print job and a scan job are performed. Alternatively, a job flow described above may be registered in an external information processing apparatus (for example, another image forming apparatus, a management terminal, or a server) which may obtain job log entries from the image forming apparatus 1. In this case, a registered job flow is downloaded, for registration, to the corresponding image forming apparatus 1.

In the exemplary embodiment described above, if the positive result is obtained in step 111 (see FIG. 13), the two corresponding job log entries are associated with a single job flow without any condition. Alternatively, a job flow may be added under the condition that characters, such as a person's name or a predetermined word (for example, a person's name), appear in a different portion. In this case, an image corresponding to the different portion may be subjected to an OCR process to extract the characters.

The above-described function of extracting a job flow may be performed as a part of firmware, or may be performed as application programs. Alternatively, the function may be performed as a plug-in.

In the exemplary embodiment described above, as the process in step 106 (see FIG. 6), all of steps 111 to 113 (see FIG. 13) are performed. Alternatively, only step 111 may be performed, or only steps 112 and 113 may be performed.

What is claimed is:

1. An information processing apparatus comprising:
a processor configured to extract two job log entries on a basis of a relationship between a first area of a common portion and a second area of a different portion, the two job log entries being associated with a single job flow and being constituted by a certain job log entry and at least one different job log entry, the common portion and the different portion being specified between an image related to the certain job log entry and an image related to the at least one different job log entry.

2. The information processing apparatus according to claim 1,
wherein first attribute information and second attribute information do not include information indicating that the images are associated with each other, the first attribute information corresponding to the certain job log entry, the second attribute information corresponding to the at least one different job log entry.

3. The information processing apparatus according to claim 2,
wherein at least one of the images related to the job log entries is an image obtained through optical reading.

4. The information processing apparatus according to claim 3,
wherein the image does not include a description about an original image.

5. The information processing apparatus according to claim 1,
wherein the processor uses a pixel count corresponding to the first area and a pixel count corresponding to the second area to obtain the first area and the second area, respectively.

6. The information processing apparatus according to claim 1,
wherein the processor uses, as the second area, an area of a closed figure including the different portion, and uses, as the first area, an area obtained by excluding the closed figure from the image for a job log entry.

7. The information processing apparatus according to claim 6,
wherein the closed figure is an input field.

8. The information processing apparatus according to claim 1,
wherein the processor extracts the two job log entries such that a ratio of the second area to the first area is equal to or less than a predetermined ratio.

9. The information processing apparatus according to claim 8,
wherein the processor extracts the two job log entries in a case where a character appears in the different portion.

10. The information processing apparatus according to claim 9,
wherein the processor extracts the two job log entries in a case where the character indicates a person's name.

11. The information processing apparatus according to claim 9,
wherein the processor extracts the two job log entries in a case where the character indicates a word that is registered in advance.

12. The information processing apparatus according to claim 1,
wherein, when a ratio of the first area to the second area is equal to or less than a predetermined ratio, if common information specifying described content is included in both of the image related to the certain job log entry and the image related to the at least one different job log entry, the processor extracts the certain job log entry and the at least one different job log entry as being included in the two job log entries associated with the single job flow.

13. The information processing apparatus according to claim 12,
wherein the common information is a string issued for a procedure.

14. The information processing apparatus according to claim 13, wherein the string includes a combination of characters of a predetermined type, the characters being of a number equal to or greater than a predetermined number.

15. The information processing apparatus according to claim 13,
wherein the string is described in a predetermined format.

16. The information processing apparatus according to claim 13,
wherein the string does not include information specifying a legal person or a natural person.

17. The information processing apparatus according to claim 1,
wherein the at least one different job log entry comprises a plurality of different job log entries.

18. A non-transitory computer readable medium storing a program causing a computer to execute a process, the process comprising:
extracting two job log entries on a basis of a relationship between a first area of a common portion and a second area of a different portion, the two job log entries being associated with a single job flow and being constituted by a certain job log entry and at least one different job log entry, the common portion and the different portion being specified between an image related to the certain job log entry and an image related to the at least one different job log entry.

19. An information processing apparatus comprising:
means for extracting two job log entries on a basis of a relationship between a first area of a common portion and a second area of a different portion, the two job log entries being associated with a single job flow and being constituted by a certain job log entry and at least one different job log entry, the common portion and the different portion being specified between an image related to the certain job log entry and an image related to the at least one different job log entry.

* * * * *